(12) United States Patent
Gottwick et al.

(10) Patent No.: US 9,048,467 B2
(45) Date of Patent: Jun. 2, 2015

(54) FUEL CELL SYSTEM WITH ENERGY-EFFICIENT REACTANT RECYCLING

(75) Inventors: Ulrich Gottwick, Stuttgart (DE); Jens Intorp, Stuttgart (DE); Daniel Zirkel, Stuttgart (DE); Gunter Wiedemann, Ludwigsburg (DE); David Schlipf, Buehlertann (DE)

(73) Assignee: Robert Bosch GmbH, Stuttgart (DE)

(*) Notice: Subject to any disclaimer, the term of this patent is extended or adjusted under 35 U.S.C. 154(b) by 733 days.

(21) Appl. No.: 13/129,288

(22) PCT Filed: Oct. 30, 2009

(86) PCT No.: PCT/EP2009/064337
§ 371 (c)(1),
(2), (4) Date: May 13, 2011

(87) PCT Pub. No.: WO2010/054937
PCT Pub. Date: May 20, 2010

(65) Prior Publication Data
US 2011/0223499 A1    Sep. 15, 2011

(30) Foreign Application Priority Data

Nov. 14, 2008 (DE) .......................... 10 2008 043 740

(51) Int. Cl.
*H01M 8/06* (2006.01)
*H01M 8/04* (2006.01)

(52) U.S. Cl.
CPC ...... *H01M 8/04097* (2013.01); *H01M 8/04089* (2013.01); *H01M 8/04388* (2013.01); *H01M 8/04231* (2013.01); *H01M 8/04462* (2013.01); *H01M 8/04761* (2013.01); *Y02E 60/50* (2013.01)

(58) Field of Classification Search
CPC ........................................................ H01M 8/06
USPC ................................. 429/415, 428, 430, 444
See application file for complete search history.

(56) References Cited

U.S. PATENT DOCUMENTS 7,359,790 B2 * 4/2008 Gottwick et al. ............. 701/102
2005/0014042 A1 * 1/2005 Brenner et al. ................ 429/22
(Continued)

FOREIGN PATENT DOCUMENTS

| DE | 10244947 A1 | 4/2003 |
| DE | 112005000906 T5 | 3/2007 |
| DE | 102006013699 A1 | 9/2007 |

(Continued)

*Primary Examiner* — Patrick Ryan
*Assistant Examiner* — Alex Usyatinsky
(74) *Attorney, Agent, or Firm* — Michael Best & Friedrich LLP

(57) ABSTRACT

The invention relates to a fuel cell system with at least one fuel cell for electrochemical conversion of two reactants. The fuel cell has two electrode areas, having a first supply line for supplying a first reactant to a first electrode area, and an outlet line, for emission of residual gas from the first electrode area. The residual gas has an electrochemically unconsumed portion of the first reactant, a recirculation element, for feeding the residual gas from the outlet line into the first supply line, and an outlet valve in order to emit the residual gas into an area surrounding the fuel cell system. The invention provides for the fuel cell system to have a monitoring unit in order to control the outlet valve. In particular, the monitoring unit opens the outlet valve when the energy required to feed the residual gas by the recirculation element exceeds an energy potential of the first reactant which is present in the residual gas.

14 Claims, 3 Drawing Sheets

(56) References Cited

U.S. PATENT DOCUMENTS

2006/0134478 A1 6/2006 Fuse
2007/0248858 A1* 10/2007 Blaszczyk et al. .............. 429/25
2009/0214909 A1 8/2009 Igarashi et al.
2009/0305100 A1 12/2009 Faye et al.
2010/0239928 A1* 9/2010 Tsuchiya ...................... 429/430

FOREIGN PATENT DOCUMENTS

| | | |
|---|---|---|
| DE | 102008005503 A1 | 7/2009 |
| WO | 2006024933 A1 | 3/2006 |
| WO | 2007098782 A1 | 9/2007 |
| WO | 2008019771 A1 | 2/2008 |
| WO | 2009016467 A1 | 2/2009 |

* cited by examiner

FUEL CELL SYSTEM WITH ENERGY-EFFICIENT REACTANT RECYCLING

CROSS-REFERENCE TO RELATED APPLICATION

This application is a 35 USC 371 application of PCT/EP 2009/064337 filed on Oct. 30, 2009.

BACKGROUND OF THE INVENTION

The present invention relates to a fuel cell system, having at least one fuel cell for electrochemical conversion of two reactants. The invention also relates to a method for operating such a fuel cell system.

DESCRIPTION OF THE PRIOR ART

Known fuel cells serve to convert hydrogen into usable electrical energy. To carry out this electrochemical reaction, the fuel cell has two electrodes, to which two reactants, such as hydrogen and oxygen, are supplied. The hydrogen supplied to one electrode—the anode—splits into $H^+$ ions, releasing electrons. While the electrons can be used for obtaining energy via an external current circuit, the protons diffuse through a membrane element to the second electrode—the cathode. At the cathode, a reaction of the protons with oxygen can ensue, so that water is created as a result. The two electrodes, with the membrane element, form a membrane electrode assembly (MEA). A flow field plate serves to distribute the reactants over an active surface of the electrode and provides mechanical stability. To make this possible, known flow field plates have cable ducts. One gas diffusion layer is disposed between each membrane electrode assembly and the flow field plate. This gas diffusion layer has the function of distributing the reactants, hydrogen or oxygen, uniformly over the entire surface of the electrodes and to carry the reaction products, that is, current, heat and water, from the electrodes.

With such fuel cells, the cathode side is supplied with air, and the anode side is supplied with pure hydrogen. For the cathode side, a constant flow is ensured by ensuring an adequate supply of oxygen and the removal of the product water. For reasons of efficiency, the attempt is made to prevent any hydrogen from entering the environment from the anode side. To ensure this, the exhaust gases emerging from the anode side are not released to the environment but instead, by means of a recirculation blower, are delivered back into the vicinity of the inlet of the flow field plate. In the context of the electrochemical conversion, the quantity of hydrogen that is made available to the anode is not reacted completely. Consequently, the exhaust gas from the anode has a certain proportion of hydrogen. It has proved disadvantageous that nitrogen and water can diffuse from the cathode to the anode and thus lead to contamination of the hydrogen at the anode. To remove the extraneous gases from the anode, a valve at the outlet can be opened. In this respect, it has proved disadvantageous that as a result, not only are the contaminants removed as intended, but unused hydrogen is removed as well.

OBJECT AND ADVANTAGES OF THE INVENTION

It is the object invention to disclose a fuel cell system which overcomes the above disadvantages and in particular efficiently utilizes the reactants made available.

In the fuel cell system of the invention, it is provided that the fuel cell system has a monitoring unit for controlling the outlet valve, and the monitoring unit opens the outlet valve when an energy demand for delivering the residual gas by means of the recirculation element exceeds an energy potential of the first reactant present in the residual gas.

The core concept of both the fuel cell system of the invention and the method of the invention is that the outlet valve is tripped as a function of the remaining reactant in the residual gas. To enable a continuous production of electric current, a constant quantity of hydrogen is supplied to the fuel cell system and/or to the fuel cell. Since it is known approximately what proportion of this hydrogen is electrochemically reacted in the anode chamber, conclusions can be drawn as to what proportion of the hydrogen emerges as residual gas from the anode chamber. This unused proportion of the hydrogen is returned to the supply line of the fuel cell by means of the recirculation element, so that the residual gas can flow back into the anode chamber. The goal is to introduce the unused proportion of the hydrogen into the anode chamber again in order to trip an electrochemical reaction there. As a result of the diffusion of nitrogen and other elements from the cathode chamber to the anode chamber, an enrichment of the hydrogen present in the residual gas with these inert components takes place. Since this is a closed system, the recirculation element must deliver not only the unused hydrogen but also the other elements of the residual gas, such as water and nitrogen, in the direction of the first supply line. Since the quantity of the unused portion of the hydrogen remains comparatively constant, but the quantity of inactive substances rises, the recirculation element uses an increasing quantity of energy. At a certain point, the energy demand of the recirculation element exceeds that potential of energy that can still be generated with the first reactant—hydrogen—present in the residual gas. Once this point is exceeded, it no longer make sense in terms of energy to deliver the residual gas with the first reactant contained in it onward. This is because even if a complete conversion of the first reactant takes place inside the anode chamber, the electrical current thus obtained is inadequate to meet the energy demand of the recirculation element for delivering the residual gas from the outlet line to the first supply line.

Within the scope of the invention, the term "energy demand" is meant to designate a quantity of energy that has to be supplied from outside to operate the recirculation element. This energy demand can be referred to a specific period of time (for instance, fractions of seconds). The term "energy potential" in the context of this invention is understood to mean the quantity of current that could be obtained from the first reactant present in the residual gas, in a complete electrochemical conversion in the fuel cell. This is accordingly the quantity of current that could be generated from the first reactant given optimal utilization.

In a first advantageous variant embodiment, it is provided that the monitoring unit has an integrated circuit. The integrated circuit can in particular be a microcontroller or an FPGA (Field Programmable Gate Array). A monitoring unit embodied in this way can serve to execute a software program for controlling and monitoring the fuel cell system and/or the outlet valve. It has furthermore proved advantageous if the monitoring unit measures a current and/or voltage generated in the fuel cell. For measuring the voltage, a suitable measuring instrument can be disposed between the two electrodes of the fuel cell and/or between the electrodes of the fuel cell system. In addition, the current can be determined inductively at a line between the electrodes of a fuel cell. As a result, it is possible for the monitoring unit to measure the electrochemically generated current.

In a further advantageous variant embodiment, the monitoring unit has a first sensor element, and the first sensor element determines a first quantity of the first reactant supplied to the fuel cell. The first sensor element can be a flow rate sensor, which measures the quantity of the first reactant in the first supply line. It is also possible to calculate the flow rate, that is, the quantity of the first reactant, from various other measured variables and with the aid of models. By means of the first sensor element, the monitoring unit can control the quantity of the first reactant that is supplied to the fuel cell.

A further advantageous variant embodiment is distinguished in that the monitoring unit has a second sensor element, and the second sensor element determines a second quantity of the first reactant present in the residual gas. The second sensor element serves to determine the energy potential directly or indirectly. The fuel cell system has a return line, which serves to return the residual gas from the anode region to the first supply line. It is thus an attractive option to dispose the second sensor element in this return line. The second sensor element can be a mass sensor, which determines the quantity of the second reactant present in the residual gas.

A further advantageous embodiment is distinguished in that the monitoring unit determines the energy potential directly or indirectly from the current and/or the first quantity of the first reactant and/or the second quantity of the first reactant. Through a reactant supply, an oxidation substance and a fuel are furnished to the fuel cell in order to generate electricity from them. Often, ambient air, which is supplied to the fuel cell, is used as the oxidation substance. However, this ambient air contains not only the oxidation substance oxygen, but also other, inert components, such as CO, $CO_2$, $N_2$ and $H_2O$. To ensure efficient operation of the fuel cell, the fuel cell is supplied with an excess of the oxidation substance and of the fuel. The quantity of excess oxidation means substance and/or fuel X is measured in λ, which is defined as follows:

$$\lambda=[(mol/sec) \text{ of X·furnished to the fuel cell}]/\cdot[(mol/sec) \text{ of X consumed in the fuel cell}].$$

The ratio should be as close as possible to 1, to attain efficient utilization of the fuel. The consumed fuel can be calculated from the electrical current. This is because the electrical current is generated by the electrochemical conversion of the fuel. By measuring the first and second quantities of the first reactant, it is possible for the monitoring unit to determine how large the electrochemically reacted quantity of the first reactant is. This can also be done in that the current is determined by the monitoring unit. Both current and the difference between the first and second quantities provide a direct indication of the quantity, reacted in the fuel cell, of the first reactant. Via the first sensor element, the monitoring unit is informed as to how large the first quantity is that was supplied to the fuel cell. The residual second quantity of the first reactant in the residual gas can be determined either with the information from the current generated, or directly. This second quantity of the first reactant that is still present in the residual gas is directly proportional to the energy potential. Consequently, to determine the energy potential from the second quantity of the first reactant present in the residual gas, all that is required is a scaling factor, which is dependent on the technical properties of the fuel cell.

An advantageous variant embodiment is distinguished in that the recirculation element has a delivery device, and the delivery device is embodied fluidically for compressing the residual gas. The recirculation element ensures that the residual gas, which is removed from the first electrode chamber by means of the outlet line, is delivered back in the direction of the first supply line. Advantageously, this recirculation element has a delivery device, such as a pump, and so forth. At the same time, the delivery device serves to compress the residual gas, in order to overcome a pressure loss of the fuel cell acting as a throttle restriction.

A further advantageous embodiment is characterized in that the monitoring unit measures a power consumption of the delivery device and/or of the recirculation element directly or indirectly. The quantity of the residual gas rises with increasing time in operation. Consequently, the delivery device and/or the recirculation element requires a higher and higher power consumption in order to deliver the residual gas from the outlet line into the first supply line. The power consumption of the delivery device and/or of the recirculation element is thus directly or indirectly linked with the energy demand for delivering the residual gas. According to the invention, is provided that the delivery device and/or the recirculation element should consume no more energy and/or current than can still be generated by means of the first reactant remaining in the residual gas. Once that amount is exceeded, the invention provides that the outlet valve is opened by the monitoring unit. Then the residual gas flows into the surroundings of the fuel cell and need no longer be moved by the delivery device and/or the recirculation element.

A further advantageous variant embodiment of the fuel cell system of the invention is distinguished in that the fuel cell system has a pumping device, which is disposed fluidically in the first supply line and is embodied for compressing the first reactant and/or the residual gas to the supplied. The first reactant is in general supplied to the fuel cell system from a tank. The tank can be a compressed gas reservoir or an adsorption reservoir. To ensure that the first reactant is supplied to the fuel cell system at a uniform pressure, it has proved advantageous to use the pumping device described. It serves to compress the first reactant and correspondingly carry the desired pressure onward to the fuel cell system and/or the fuel cell. Since the residual gas is carried into the first supply line by means of the recirculation element, the pumping device can be disposed such that it too is embodied for compressing the residual gas.

The object of the invention is also attained by the method, disclosed here, for operating a fuel cell system having at least one fuel cell, wherein in an operating state, two reactants are electrochemically reacted in the fuel cell system;

the two reactants are supplied to two electrode chambers by means of two supply lines;

an electrochemically unused portion of a first reactant in a residual gas is diverted from a first electrode chamber;

a recirculation element delivers the residual gas into a first supply line of the first electrode chamber; and by means of an outlet valve, the residual gas is diverted into a surrounding area of the fuel cell system, when an energy demand for delivering the residual gas exceeds an energy potential of the first reactant present the residual gas.

All the characteristics recited with regard to the fuel cell system apply to the method of the invention, and vice versa.

In the context of the electrochemical reaction, inert components can be generated and/or supplied to the residual gas by one of the reactants. In particular, this can involve nitrogen, which is added to the fuel cell by the ambient air. The quantity of the inert components and thus the quantity of the residual gas rise in the course of the operating state of the fuel cell system. To avoid delivering the residual gas in an unfavorable way in terms of energy, it is provided according to the invention that the outlet valve diverts the residual gas into a surrounding area of the fuel cell system, if the energy demand for delivering the residual gas is greater than the energy potential of the first reactant present in the residual gas. According to the invention, in a further advantageous method step, the energy demand for delivering the residual gas can be determined from a technical variable, in particular a current of a fuel cell or a power consumption of a recirculation element provided for delivering the residual gas. Advantageously, the generated current of the fuel cell or the power consumption of the recirculation element is ascertained with an ammeter and/or a similarly designed measuring instrument.

A further advantageous method step is distinguished in that the energy potential is determined from a second quantity of the first reactant present in the residual gas. The energy potential serves as a measure of whether further delivering of the residual gas still makes sense, or whether opening of the outlet valve should be tripped. The energy potential can advantageously be determined directly or indirectly from a current that can be generated in the fuel cell from the first reactant present in the residual gas. Consequently, the energy potential reflects the current that could be generated if the first reactant in the fuel cell were reacted completely.

Advantageously, the method can further have the following steps:
 determining a first quantity of the first reactant supplied to the fuel cell;
 ascertaining the proportion of the first reactant electrochemically reacted in the fuel cell;
 calculating a ratio of the supplied first quantity and the electrochemically reacted proportion; and
 determining a second quantity of the first reactant present in the residual gas.

These steps to determine the energy potential and/or the second quantity of the first reactant present in the residual gas. On the basis of the individual steps, it can be determined whether the time has arrived for opening the outlet valve and releasing the residual gas into the surrounding area of the fuel cell.

It has proved especially advantageous if the fuel cell system of the invention, which has been described above, is operated by one of the methods disclosed here.

BRIEF DESCRIPTION OF THE DRAWINGS

Further advantages, characteristics, or details of the invention are described in the ensuing description, in which exemplary embodiments of the invention are explained in detail in conjunction with the drawings. The characteristics mentioned in the claims and in the specification can each be essential to the invention individually, or in arbitrary combination. In the drawings:

DESCRIPTION OF THE PREFERRED EMBODIMENTS

Figure 1:
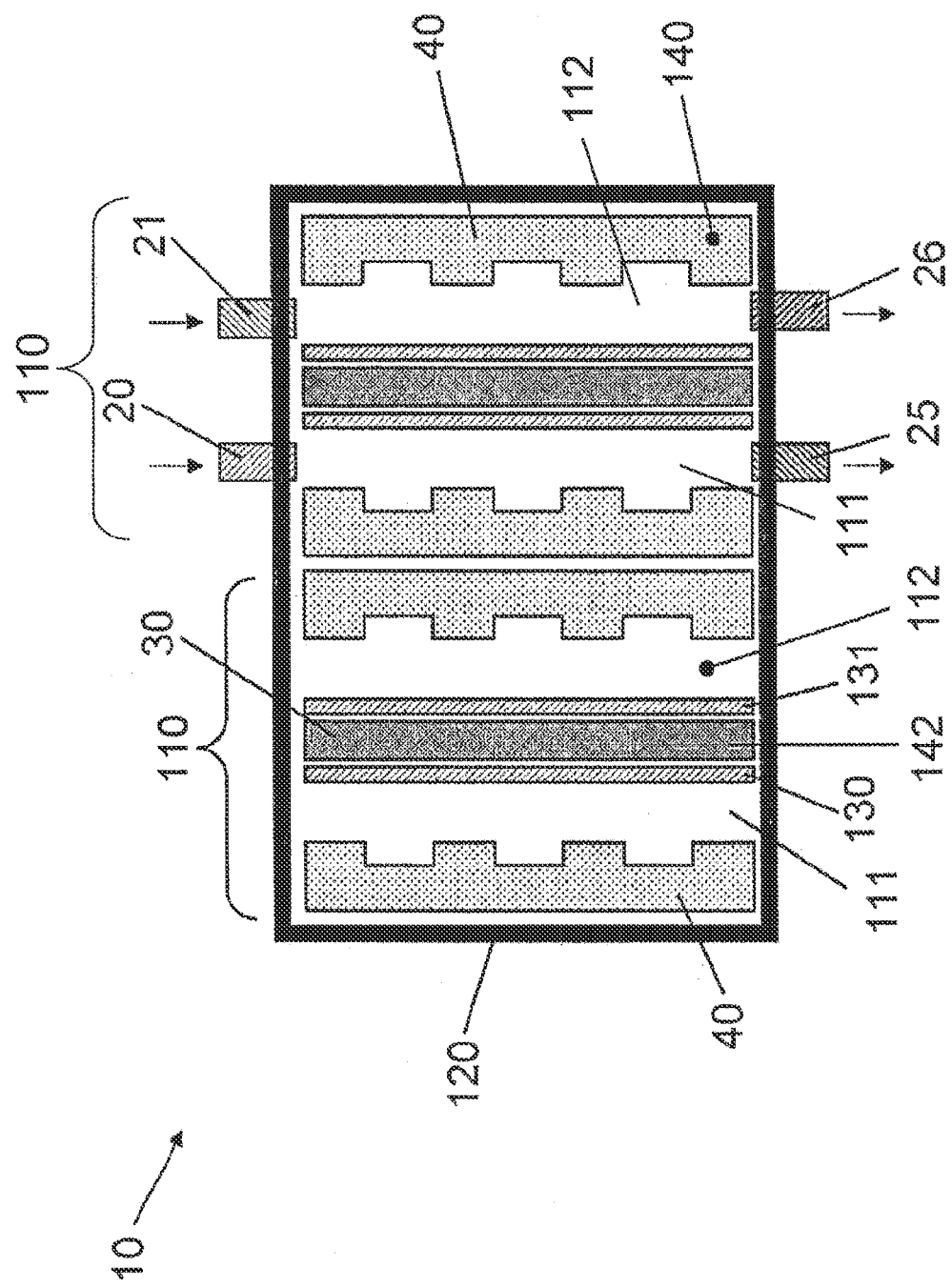
FIG. 1 shows a first fuel cell system according to the invention.

In FIG. 1, a fuel cell system 10 is shown, which here has two fuel cells 110. These fuel cells 110 are disposed adjoining one another in a housing 120. Each of the fuel cells 110 has a first electrode element 130 and a second electrode element 131. Between the two electrode elements 130, 131, there is an ion-permeable membrane 142. By subjecting the electrode elements 130, 131 to two different reactants, an electric current is generated by an electrochemical reaction. The two reactants are often furnished in the form of various fluids. One example for the two corresponding electrode reactions are as follows:

$$H_2 => H^+ + 2e^-$$ (anode reaction)

$$2H^+ + 2e^- + \tfrac{1}{2}O_2 => H_2O$$ (cathode reaction).

The reactant oxygen can be supplied to the fuel cell in the form of ambient air. By means of the serial linkage of the various fuel cells 110 by means of a line element, it is possible to attain a high voltage, which can be made available to the load element, such as an electric motor. To achieve uniform distribution of the reactants to the electrode elements 130, each of the electrode chambers of the fuel cell 110 has a flow field plate 140.

Below, the fuel cell system of the invention will be explained in terms of a fuel cell 110, which uses hydrogen and oxygen as reactants. However, this should in no way whatever be understood as a limitation of the invention. Instead, the selection of hydrogen and water as reactants serves the purpose solely of clearly illustrating the invention. Other fuel cells that use different reactants can also be employed by the method of the invention and/or the fuel cell system of the invention.

As FIG. 1 shows, the first reactant is supplied to the first electrode chamber 111 by means of a first supply line 20. Parallel to this, the second reactant is introduced into the second electrode chamber 112 via a second supply line 21. In the exemplary embodiment described here, through the first supply line 20 hydrogen is introduced into the first electrode chamber 111—hereinafter also called anode chamber. The hydrogen thus introduced can react electrochemically with oxygen. This oxygen is supplied to the fuel cell 110 via the second supply line 21. In general, ambient air is introduced for that purpose through the second supply line 21 into the second electrode chamber 112. As described, an electrochemical reaction can then take place at the membrane and the electrode elements. From the second electrode chamber 112—hereinafter also called cathode chamber—the remaining air is removed through a cathode outlet line 26. Through this cathode outlet line 26 as well, some of the product water that is created in the electrochemical reaction in the fuel cell 110 is removed.

It has proved disadvantageous that inert components, such as $N_2$ diffuse through the membrane element 142 from the second electrode chamber 112 into the first electrode chamber 111 and accumulate there. If there is an overly high concentration of these inert components in the residual gas, an inadequate supply to the fuel cell 110 can occur despite recirculation of this residual gas, and this can lead to a dip in the voltage level. To prevent that, an outlet valve 50 is opened in order to flush the residual gas out of the fuel cell 110. This procedure will now be described with the aid of FIG. 2.

Figure 2:
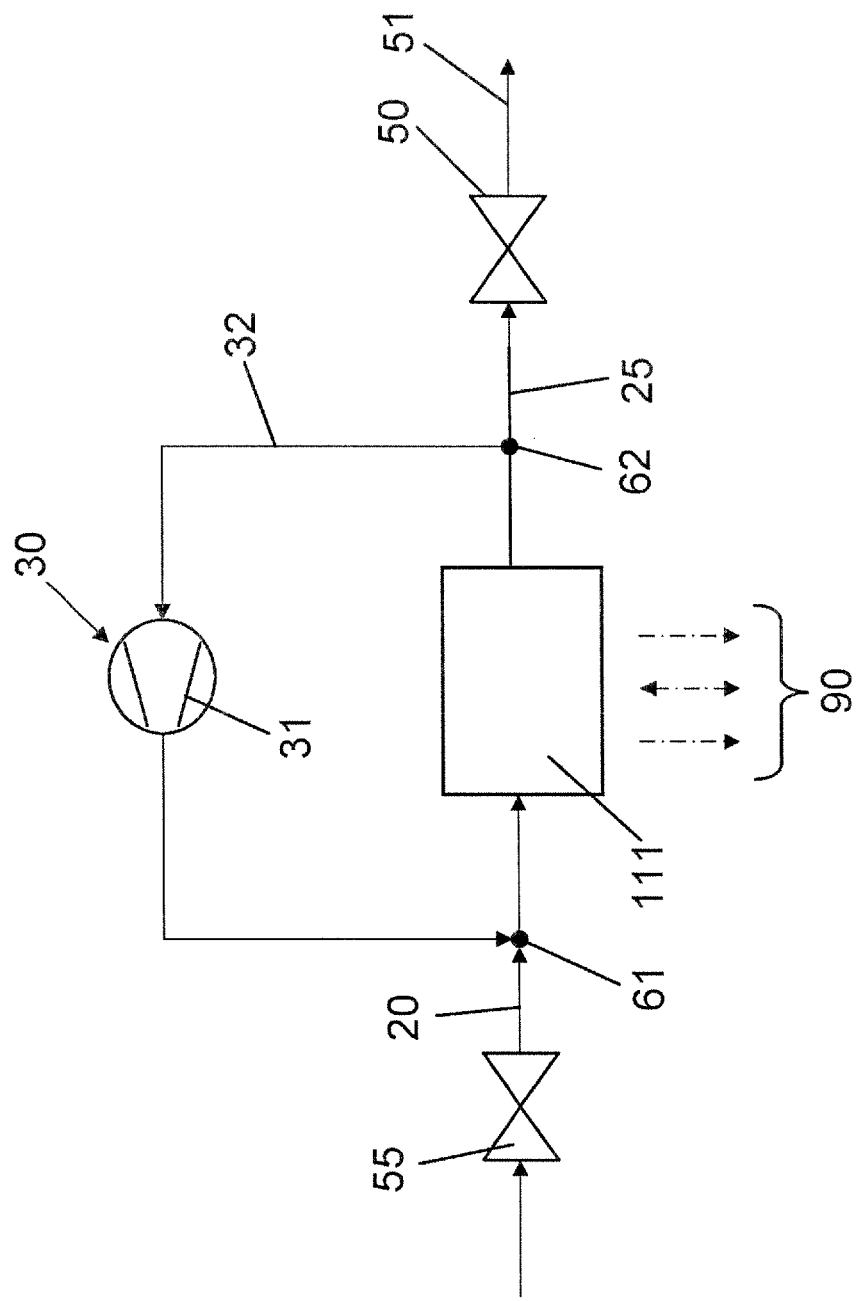
FIG. 2 shows the fuel cell system of the invention in a schematic illustration.

FIG. 2 shows a schematic illustration of the first electrode chamber 111 of the fuel cell 110. According to the invention, this electrode chamber 111 is particularly significant, because the first reactant is reacted in it. This first reactant, in this case hydrogen, flows through an inlet valve 55 into the first supply line 20. A first sensor element 61 determines a first quantity of the hydrogen supplied to the fuel cell. This hydrogen flows into the first electrode chamber 111 and is electrochemically reacted there. To enable safe operation of the fuel cell 110, the first quantity of hydrogen is elected to be greater than what is actually reacted in the fuel cell 110. Thus what flows out of the outlet line 25 is a residual gas which among other things has an electrochemically unused portion of the first reactant. Since hydrogen is an expensive reactant, it has proved advantageous for the sake of efficiency not to release this residual gas into the environment through the outlet line 25, but instead to return it to the first supply line 20 by means of a return line 32. Thus a circuit is created, which ensures that the hydrogen emerging from the fuel cell 110 is returned to the electrochemical reaction.

A recirculation element 30 is integrated into the return line 32 and serves to deliver the residual gas 90 into the first supply line 20 of the first electrode chamber 111. According to the invention a delivery device 31, which is embodied fluidically for compressing the residual gas 90, is integrated with the recirculation element. The residual gas 90 has primarily two components: an unused portion 92 of the first reactant, and inert components 91. These inert components 91 are primarily nitrogen, which reaches the fuel cell 110 with the ambient air. The ambient serves to carry the second reactant, designed as an oxidation means, into the fuel cell. Since ambient air contains not only pure oxygen, still other gaseous elements are also transported into the fuel cell. In particular, the nitrogen from the ambient air can diffuse through the membrane into the first electrode chamber 111 and forms a decisive portion of the residual gas 90. The recirculation element 30 serves to deliver this residual gas 90 back from the outlet of the fuel cell to the first supply line 20. By means of suitable adjustment of the inlet valve 55, both the quantity of the supplied hydrogen and its concentration in the residual gas are nearly constant. However, over time, the quantity of inert components 91 present in the residual gas increases. Consequently, over time, the recirculation element 30 has to recirculate a increasingly large volume of residual gas 90. The energy demand for delivering the residual gas 90 increases over time. In the prior art, it is known to provide the outlet valve 50 with a defined leakage rate, so that the residual gas 90 is constantly being released into the surrounding area 51 of the fuel cell. However, that embodiment has the disadvantage that not only the unwanted substances but also the unused first reactant are released into the surrounding area 51.

Figure 3:
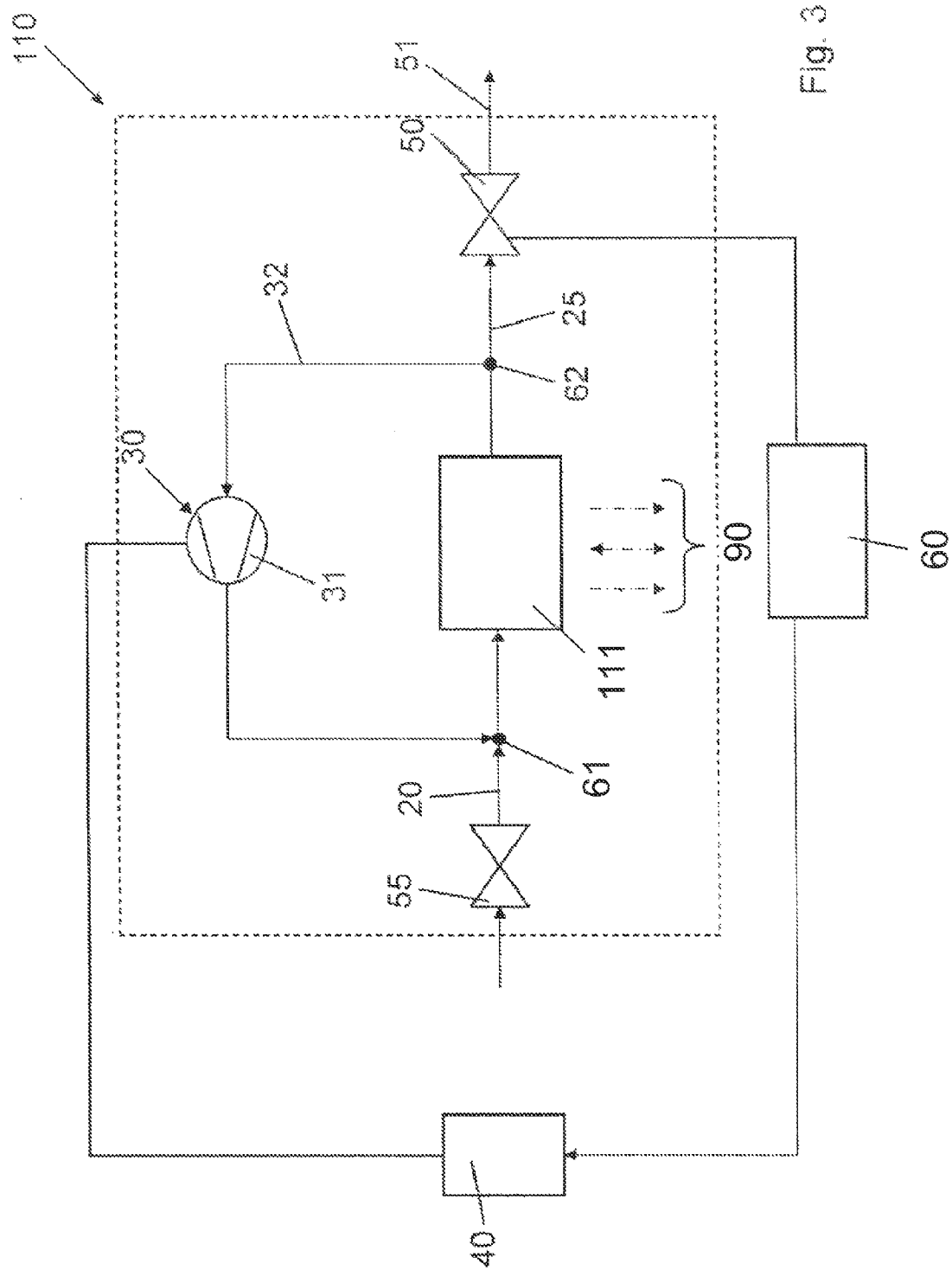
FIG. 3 shows a further schematic illustration of the fuel cell system of the invention.

To overcome this disadvantage, it is provided according to the invention that the fuel cell system 10 has a monitoring unit 60, for controlling the outlet valve 50, as is also shown in FIG. 3. It is provided that the monitoring unit 60 opens the outlet valve 50, if the energy demand for delivering the residual gas 90 by means of the recirculation element 30 exceeds an energy potential in the first reactant present in the residual gas 90. The term energy demand is understood to mean the quantity of current and/or voltage that the recirculation element 30 and/or the delivery device 31 needs in order to deliver the residual gas 90 from the outlet line 25 into the first supply line 20. A corresponding measuring instrument can be disposed in the monitoring unit 60 or in the recirculation element 30. In FIG. 3, this is illustrated by a regulator 40, which is connected to the recirculation element 30 and furnishes the control voltage for the recirculation element 30. This control voltage can be ascertained by the monitoring unit 60. A first sensor element 61 is integrated with the first supply line 20, and the first sensor element 61 serves to determine the first quantity of the first reactant supplied to the fuel cell 110. In addition, there is a second sensor element 62 in the return line 32. This second sensor element 62 serves to determine the second quantity of the first reactant that is present in the residual gas. The second quantity is the unused portion 92 of the first reactant. By measuring this proportion of the second quantity and/or of the unused portion 92 of the first reactant in the residual gas, it is possible for the monitoring unit 60 to calculate what the maximum quantity of electrical power is that can be generated from that proportion of the first reactant. It can be assumed that in the optimum case, a complete conversionl of the unused portion 92 present in the residual gas 90 and/or of the second quantity of the first reactant can take place in the fuel cell 110. The energy potential, resulting from this reaction, of the first reactant present in the residual gas is compared with the current energy demand for delivering the residual gas 90. If the energy demand of the recirculation element 30 exceeds the energy potential of the first reactant present in the residual gas, the monitoring unit 60 opens the outlet valve 50. As a result, the residual gas 90 flows into the surrounding area 51 of the fuel cell 110.

The foregoing relates to the preferred exemplary embodiment of the invention, it being understood that other variants and embodiments thereof are possible within the spirit and scope of the invention, the latter being defined by the appended claims.

The invention claimed is:

1. A fuel cell system, having at least one fuel cell for electrochemical conversion of reactants, in which the fuel cell has two electrode chambers, comprising:
    a first supply line, for supplying a first reactant into a first electrode chamber;
    an outlet line, for diverting a residual gas from the first electrode chamber, the residual gas having an electrochemically unused portion of the first reactant;
    a recirculation element, for delivering the residual gas from the outlet line to the first supply line;
    an outlet valve, for diverting the residual gas into a surrounding area of the fuel cell system; and
    a monitoring unit for controlling the outlet valve, wherein the monitoring unit is programmed to open the outlet valve when an energy demand for delivering the residual gas by means of the recirculation element exceeds an energy potential of the first reactant present in the residual gas.

2. The fuel cell system as defined by claim 1, wherein the monitoring unit measures a current generated in the fuel cell.

3. The fuel cell system as defined by claim 1, wherein the monitoring unit has a first sensor element, and the first sensor element determines a first quantity of the first reactant supplied to the fuel cell, and in particular that the first sensor element is disposed in the first supply line.

4. The fuel cell system as defined by claim 2, wherein the monitoring unit has a first sensor element, and the first sensor element determines a first quantity of the first reactant supplied to the fuel cell, and in particular that the first sensor element is disposed in the first supply line.

5. The fuel cell system as defined by claim 3, wherein the monitoring unit has a second sensor element, and the second sensor element determines a second quantity of the first reactant present in the residual gas, and in particular that the second sensor element is disposed in a return line.

6. The fuel cell system as defined by claim 4, wherein the monitoring unit has a second sensor element, and the second sensor element determines a second quantity of the first reactant present in the residual gas, and in particular that the second sensor element is disposed in a return line.

7. The fuel cell system as defined by claim 5, wherein the monitoring unit determines the energy potential directly or indirectly from the current and/or from the first quantity and/or the second quantity of the first reactant.

8. The fuel cell system as defined by claim 6, wherein the monitoring unit determines the energy potential directly or indirectly from the current and/or from the first quantity and/or the second quantity of the first reactant.

9. The fuel cell system as defined by claim 1, wherein the recirculation element has a delivery device, and the delivery device is embodied fluidically for compressing the residual gas.

10. The fuel cell system as defined by claim 8, wherein the recirculation element has a delivery device, and the delivery device is embodied fluidically for compressing the residual gas.

11. The fuel cell system as defined by claim 9, wherein the monitoring unit measures a power consumption of the delivery device directly or indirectly.

12. The fuel cell system as defined by claim 10, wherein the monitoring unit measures a power consumption of the delivery device directly or indirectly.

13. The fuel cell system as defined by claim 1, wherein the fuel cell system has a pumping device, which is disposed fluidically in the first supply line and is embodied for compressing the first reactant and/or the residual gas to be supplied.

14. The fuel cell system as defined by claim 12, wherein the fuel cell system has a pumping device, which is disposed fluidically in the first supply line and is embodied for compressing the first reactant and/or the residual gas to be supplied.

* * * * *